(12) United States Patent
Dicleli et al.

(10) Patent No.: US 8,438,795 B2
(45) Date of Patent: May 14, 2013

(54) MULTI-DIRECTIONAL TORSIONAL HYSTERETIC DAMPER (MTHD)

(76) Inventors: Murat Dicleli, Ankara (TR); Ali Salem Milani, Ankara (TR)

( * ) Notice: Subject to any disclaimer, the term of this patent is extended or adjusted under 35 U.S.C. 154(b) by 22 days.

(21) Appl. No.: 13/201,451

(22) PCT Filed: Feb. 16, 2009

(86) PCT No.: PCT/TR2009/000027
§ 371 (c)(1),
(2), (4) Date: Dec. 6, 2011

(87) PCT Pub. No.: WO2010/093337
PCT Pub. Date: Aug. 19, 2010

(65) Prior Publication Data
US 2012/0066986 A1    Mar. 22, 2012

(51) Int. Cl.
*E04B 1/98*  (2006.01)
*E04H 9/02* (2006.01)

(52) U.S. Cl.
USPC .......... 52/167.1; 52/167.4; 52/167.7; 14/73.5

(58) Field of Classification Search .................... 14/73.5, 14/77.1, 78; 52/167.1, 167.2, 167.4, 167.7, 52/167.8, 167.9; 248/562, 563, 548, 636; 384/36
See application file for complete search history.

(56) References Cited

U.S. PATENT DOCUMENTS

| | | | | |
|---|---|---|---|---|
| 3,876,244 | A * | 4/1975 | Haberle et al. | 293/121 |
| 4,633,628 | A * | 1/1987 | Mostaghel | 52/167.7 |
| 4,712,938 | A * | 12/1987 | Seshamani et al. | 403/24 |
| 4,987,711 | A * | 1/1991 | Noji et al. | 52/167.2 |
| 5,509,238 | A * | 4/1996 | Scalfati | 52/167.7 |
| 5,806,250 | A * | 9/1998 | Medeot et al. | 52/167.1 |
| 7,540,117 | B2 * | 6/2009 | Yang | 52/167.4 |
| 7,762,030 | B2 * | 7/2010 | Espinosa | 52/293.3 |
| 2004/0135056 | A1 * | 7/2004 | Chuang | 248/562 |

FOREIGN PATENT DOCUMENTS

| | | | | |
|---|---|---|---|---|
| JP | 62088836 | A | * | 4/1987 |
| JP | 06229143 | A | * | 8/1994 |

* cited by examiner

*Primary Examiner* — Brian Glessner
*Assistant Examiner* — Joseph J Sadlon
(74) *Attorney, Agent, or Firm* — Gokalp Bayramoglu (57) ABSTRACT

The invention relates to seismic protection (anti-seismic) devices and, in particular, to seismic hysteretic dampers, used to protect the structures against severe earthquakes. These devices are installed at points where large displacements are expected due to earthquake shakings, such as between a bridge deck and bearing points of said bridge (e.g. the pier cap beam).

3 Claims, 7 Drawing Sheets

MULTI-DIRECTIONAL TORSIONAL HYSTERETIC DAMPER (MTHD)

RELATED FIELD OF THE INVENTION

The invention relates to seismic resistant (anti-seismic) devices and, in particular, to seismic hysteretic dampers, used to protect the structures against severe earthquakes. These devices are installed at points where large displacements is are expected due to earthquake shakings, such as between the bridge deck and bearing points (pier cap beam).

BACKGROUND OF THE INVENTION

Prior Art

Dampers are energy dissipaters. They dissipate the kinetic energy swept into them due to the relative motion of two (mounting) ends. Speaking in terms of force-displacement rather than energy, they work by exerting a force upon their moving ends which always opposes the relative displacement of two ends. We shall call this force that can be used as a measure of energy dissipation capacity of the damper, the 'reaction force' of the damper. In hysteretic dampers such property is achieved by utilizing the hysteretic behavior in metals.

The available multi-directional hysteretic dampers for bridges in the prior art are, a device composed of Crescent Moon Shaped elements as described in U.S. Pat. No. 5,806,250 and Tapered Pin energy dissipating elements and device composed of C-clamps as described in U.S. Pat. No. 5,509,238. Other hysteretic dampers are also available in the prior art, though they do not have multi-directional action, such as Butterfly-Shaped energy dissipating elements.

Another shock absorbing mounting in the prior art is basically a vibration isolator as described in U.S. Pat. No. 3,730,463 with a self-centering annular rubber working as the spring-damper element. The use of rubber, as in the case of bridge elastomeric isolators, is to create a soft connection and to increase the natural period of the supported structure and hence, making it less vulnerable to shock type movements. The function of a hysteretic damper like the one presented in the present invention, on the other hand, is not the isolation of the structure rather, increasing energy dissipation by providing a dissipative force through yielding of metals. Although the shock absorbing mounting can possesses slight damping, it is not a hysteretic damper and as being a self-centering system, it cannot have a large damping.

In multidirectional devices composed of crescent moon shaped energy dissipaters, Italian patent No. MI96A1447, curved variable section beams are used as energy dissipaters. These energy dissipating elements are so shaped as to allow for uniform yielding along the length of the element and are so arranged as to create a symmetric device in which all of these 'individual' energy dissipaters work together as a unit to create a larger reaction force.

In the device composed of C clamps, C-shaped (or U-shaped) plates are arranged into a multi-directional device in a symmetric arrangement. C-shaped plates provide hysteretic energy dissipation as they bend and yield along the width, in a folding/unfolding deflection.

Tapered pin elements are straight beams with circular sections variable along the length, so that bending causes uniform yielding along the height, avoiding strain concentration. Because of their 'inherent' symmetry along all directions, they can be simply arranged into a multi directional damper system without the need for any mechanism to bring them into multi directional action.

The main differences between the invented device (MTHD) and the aforementioned existing devices are explained in the following section.

AIMS OF THE INVENTION

The aim of the present invention is to develop a multidirectional hysteretic damper, better or as effective in behavior as the available hysteretic dampers and economical to manufacture. As far as the behavior is concerned, the main difference between the invented device and the available ones can be summarized as:

1. Variable post-elastic stiffness as a result of its special working mechanism which creates a geometric hardening effect which will be explained subsequently and is shown in graph in FIG. 13,
2. Easily adjustable arm (and rail) length allows for easily adjustable properties of the device: reaction force and maximum allowable displacement.
3. The device allows for the relative vertical displacements between the top and bottom anchoring points without any interference of such displacements with the intended behavior of the system in the horizontal direction.

BRIEF DESCRIPTION OF THE INVENTION

Although the use of cylindrical steel cores as hysteretic damping elements is known in the prior art, the design through which they are assembled into a multi-directional hysteretic damper is the new and unique feature of the present invention.

The basic parts of the present invention consist of;
Yielding cores with arm assembly (composed of parts 1, 2, 4, 7, 8, 9),
A central supporting structure (composed of parts 5, 6),
A rail system (composed of parts 10, 11).

DEFINITION OF THE FIGURES

In order to explain the present invention in here detail, necessary figures have been prepared and attached to the description. The list and definition of the figures are given below.

DEFINITION OF THE ELEMENTS (FEATURES/COMPONENTS/PARTS) ON THE FIGURES

1 Yielding core,
2 Arm,
3 Core ball bearing is an ordinary steel ball bearing used to create the hinge connection between the core (1) and plate diaphragm (6). Since it is used at the core-diaphragm connection, we may call it 'core' ball bearing to distinguish it from arm ball bearing,
4 Arm ball bearing is an ordinary steel ball bearing used to create the roller hinge connection between the arm (2) and rail (10),
5 Supporting column,
6 Plate diaphragm, with circular holes,
7 Solid, cylindrical, mounting shaft welded to the arm for mounting the arm ball bearing,
8 Upper hollow cylindrical ring welded at the top to the cylindrical shaft to hold the arm ball bearings in place. Also any other type of attachment such as a pin can be used instead of upper hollow cylindrical ring,
9 Bottom hollow cylindrical ring to hold the arm ball bearing in place. Also any other type of attachment such as a pin can be used instead of bottom hollow cylindrical ring,
10 Rail, there are eight of them, as part of the rail system. Guide rails for arm ball bearing.
11 Top plate (a part of the rail system) with slits (or any other appropriate arrangement of slits depending on the type of connection) to allow for top connection of the device (to bridge deck),
12 Base plate, to connect the entire device to the base (pier cap beam).

DETAILED DESCRIPTION OF THE INVENTION

Figure 1:
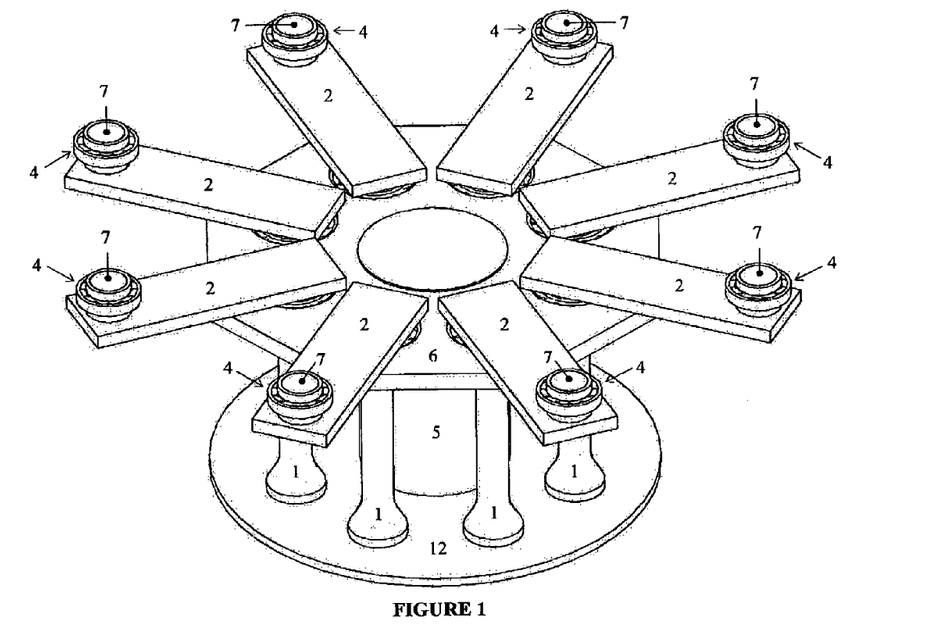
FIG. 1. 3D isometric view of the device with the rail system removed to allow for a better view of all the parts underneath, FIG. 2. 3D isometric view of the rail system, FIG. 3. 3D isometric view of the device with the overlaid sketch of rail system, FIG. 4. Side view of the device with the rail system removed, FIG. 5. Top view of the device with the rail system removed, FIG. 6. Top view of the entire device with all the parts showing (no hidden lines), FIG. 7. Cutaway view S1-S1 according to FIG. 4, FIG. 8. Cutaway view S2-S2 according to FIG. 5, FIG. 9. S3-S3 view according to FIG. 6, FIG. 10, Rail system, bottom view, FIG. 11. Rail system, top view.
Figure 2:
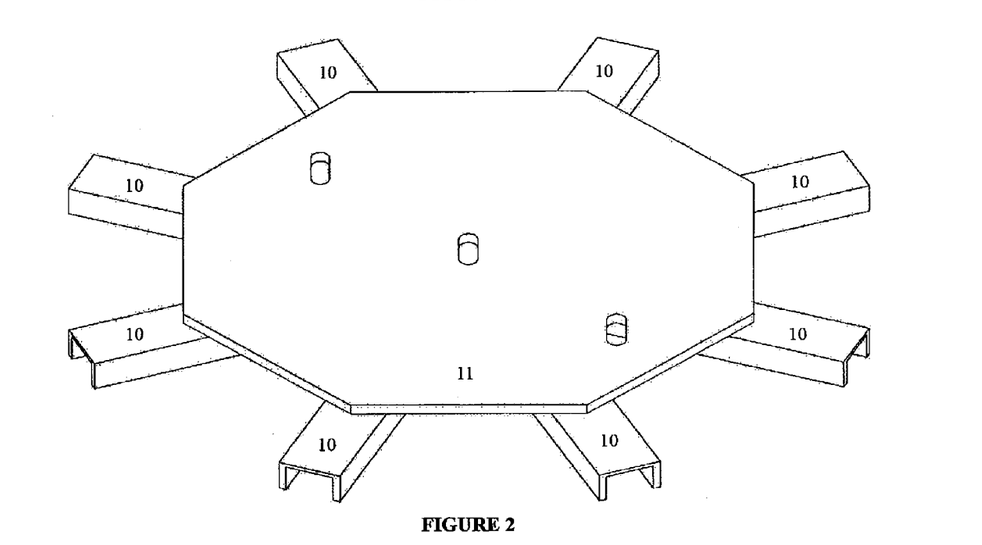
Figure 3:
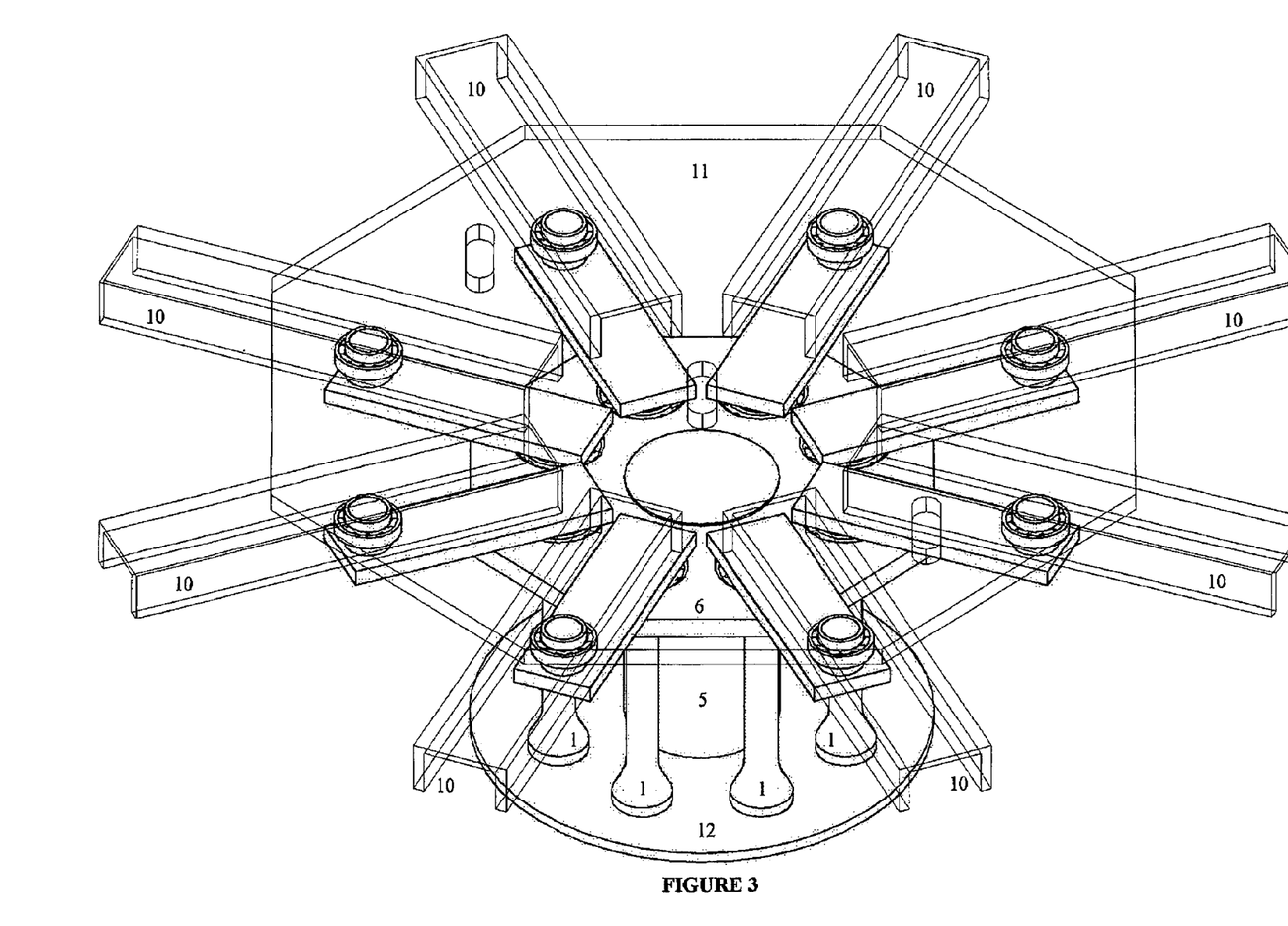
Figure 4:
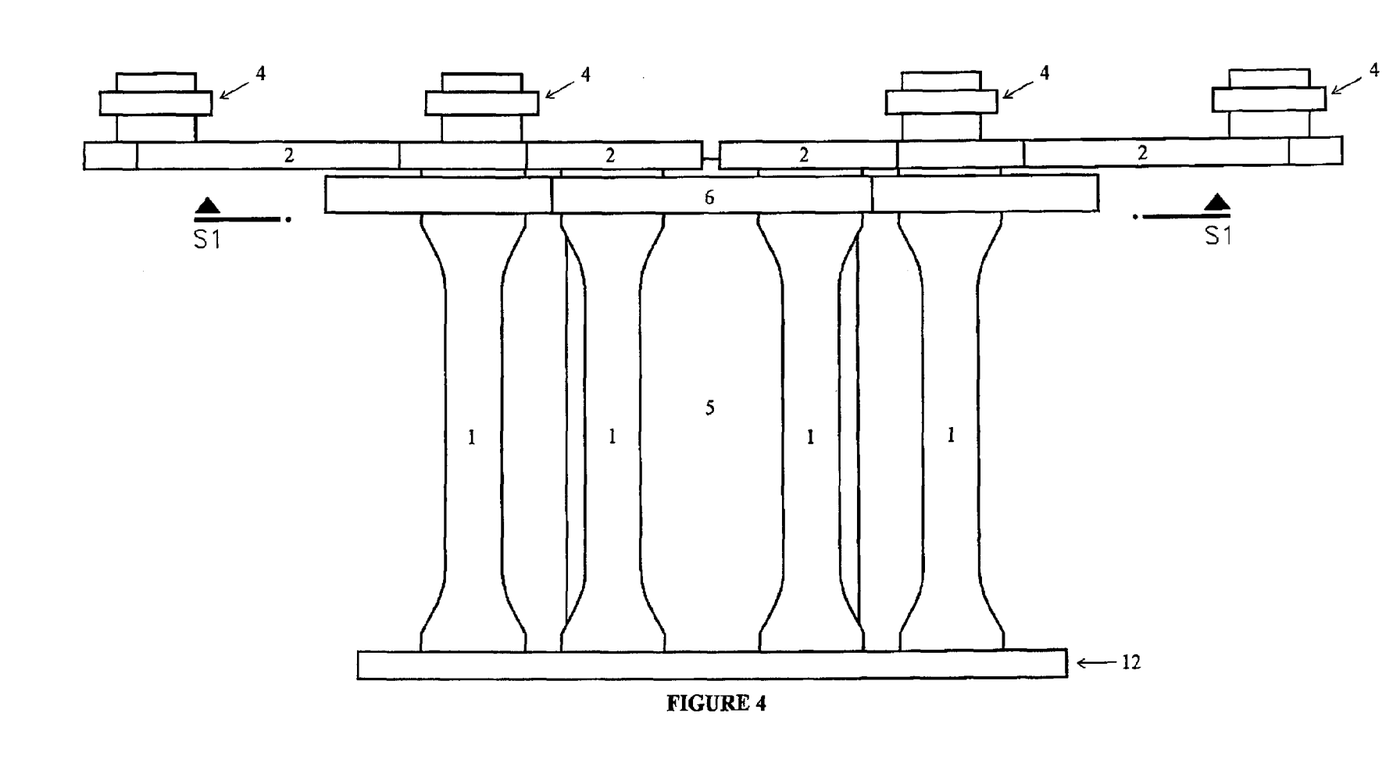
Figure 5:
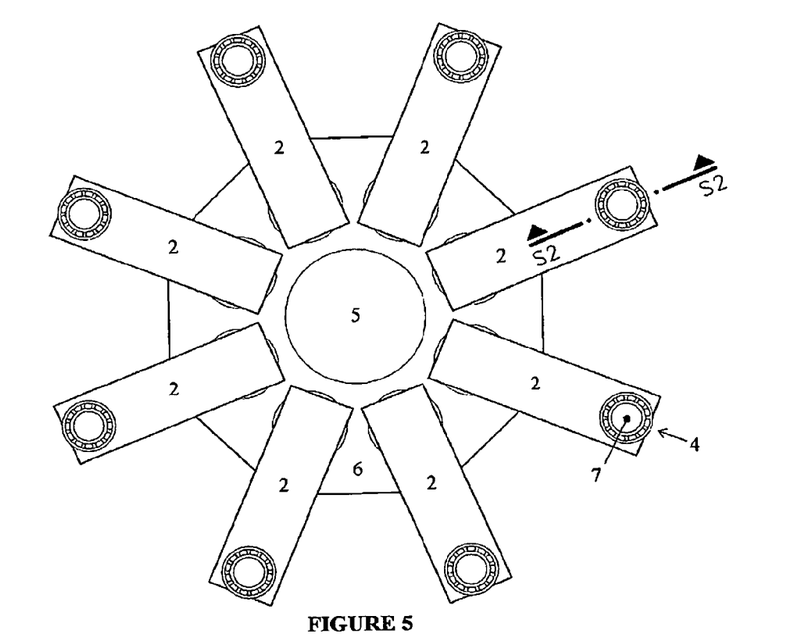
Figure 6:
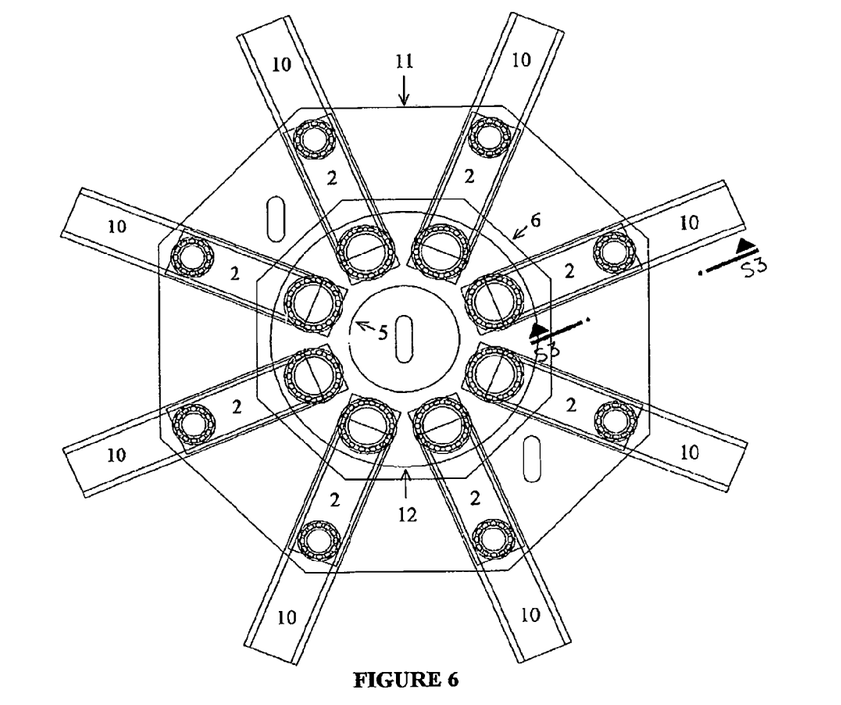
Figure 7:
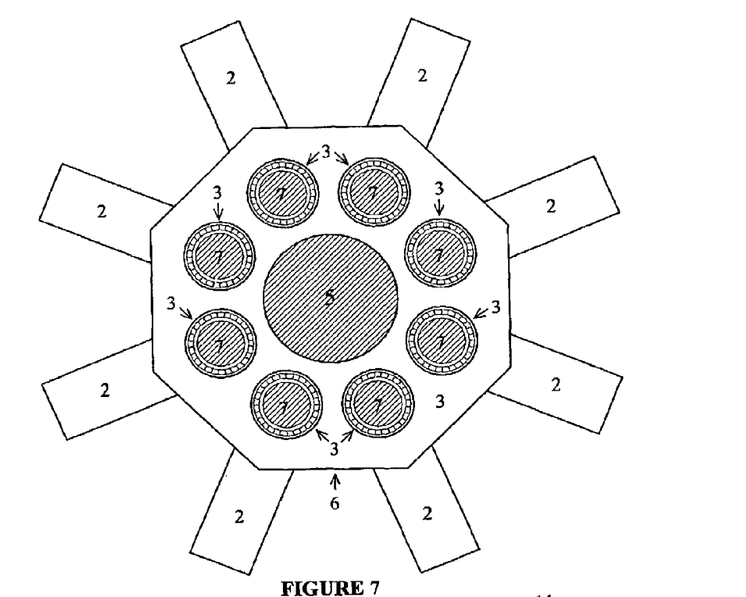
Figures 8, 9:
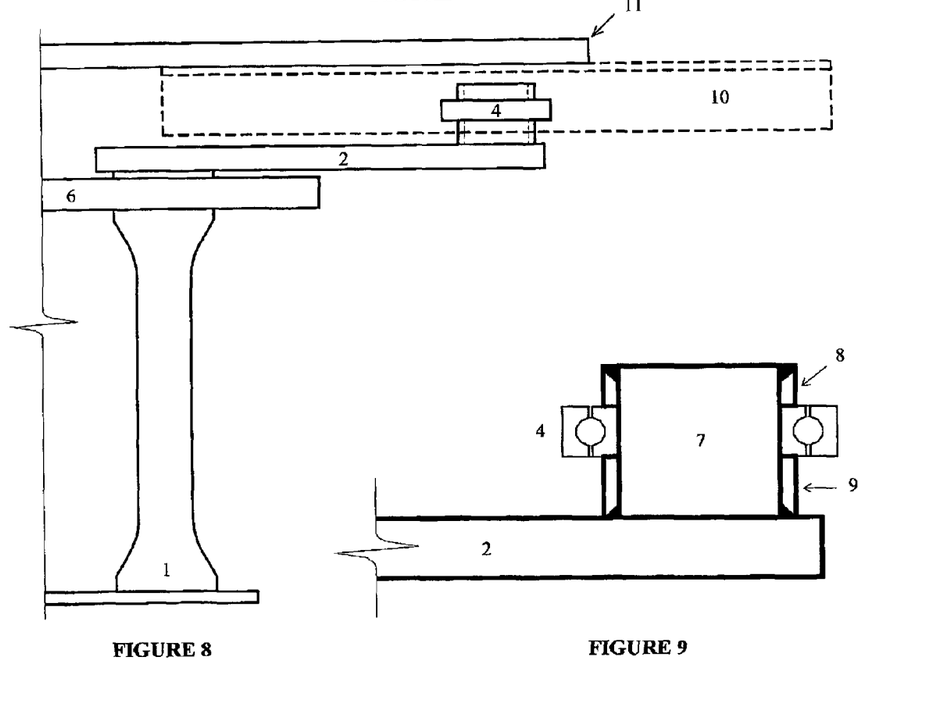
Figure 10:
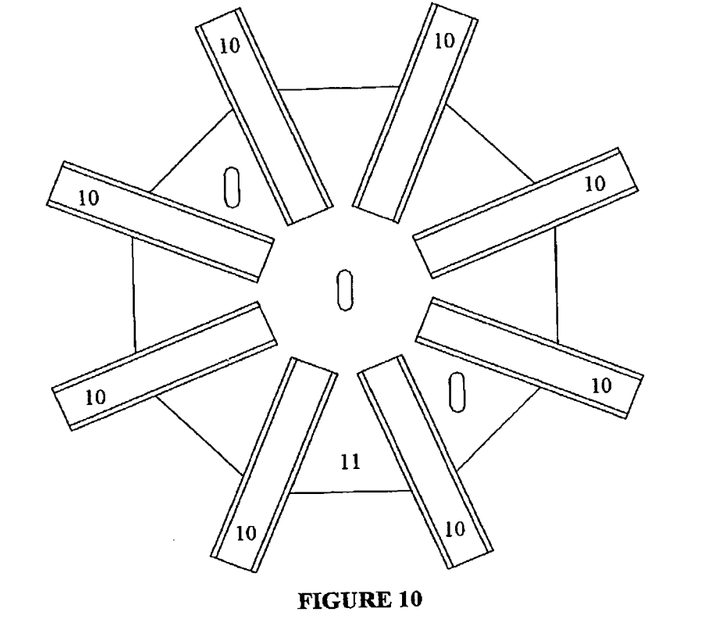
Figure 11:
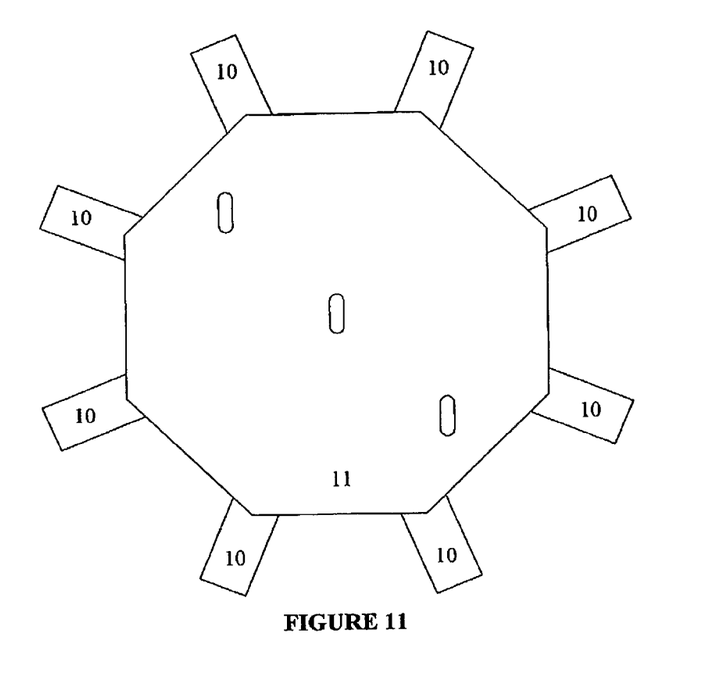

The said hysteretic damper device related to the present invention consists of three main parts;
1. The Yielding Core: Along with the arm assembly which includes a steel ball bearing (4) to create a roller hinge type connection between the arm (2) and the rail system and allow for frictionless movement of the arm (2) end inside the rail (10). The arm (2) is welded to the yielding core (1) on one end (at top) and in the other end has a cylindrical solid shaft (7) welded to it which serves as a mounting axis for the arm ball bearing (4), all shown in FIG. 9. There are also two rings (8, 9) on the top and bottom sides of the arm ball bearing (4) to fix it in place. Also any other type of attachment such as a pin can be used instead of upper and bottom hollow cylindrical rings (8, 9). The upper ring (8) is welded to the mounting shaft (7). The yielding cores (1) are energy dissipation elements of the said hysteretic damper of the present invention and are made of steel. At least eight identical cores (1), in the shape of variable-diameter cylinder, which can yield, mostly due to large torsional shear stresses, and dissipate energy as the arms (2) rotate. The yielding cores (1) are welded to a base plate (12) (at bottom), thus the entire device (hysteretic damper) can be attached to the pier cap beam of the bridge through the base plate (12).
2. The Supporting Structure: The Supporting Structure is composed of a central solid steel supporting column (5) and a plate diaphragm (6) welded to it. The plate diaphragm (6) will be connected to the yielding cores (1) through core ball bearings (3). The core ball bearings (3) are incorporated to create a (torsional) hinge connection between the yielding cores (1) and the plate diaphragm (6), allowing for free twisting of the cores (1). The main function of the supporting column (5) is to support the yielding cores (1) against bending. Due to its large lateral stiffness and its parallel connection with the cores (1), the central supporting column (5) will take the major share of the bending moment and thus preventing large bending stresses in the yielding cores (1) which are intended to yield in nearly pure torsional shear.

The central supporting column (5) can be in any other shape, such as a box or an octagonal prism as long as it provides the necessary lateral stiffness. The central supporting column (5) will be welded to the base plate (12). The plate diaphragm's (6) connection to the supporting column (5) is also by welding at the top and bottom of the central hole of the plate diaphragm (6).
3. The Rail System: The rail system facilitates the connection between the bridge deck and the arms (2). The rail system will be attached to the deck through pins and holes and, if required, a shock transmission unit. It is composed of a top plate (11) with slotted holes on it and rails (10) welded to this plate (11). The rails (10) can be steel plates welded together to form a channel section or, in case rolled channel sections with suitable dimensions are available, can be used as rails (10). Depending on the case, side stiffeners might be needed to laterally stiffen the cantilever part of the rail channels. The connection of the top plate (11) to the deck is made by bars (pins) embedded inside the concrete deck of the bridge.

Figure 12:
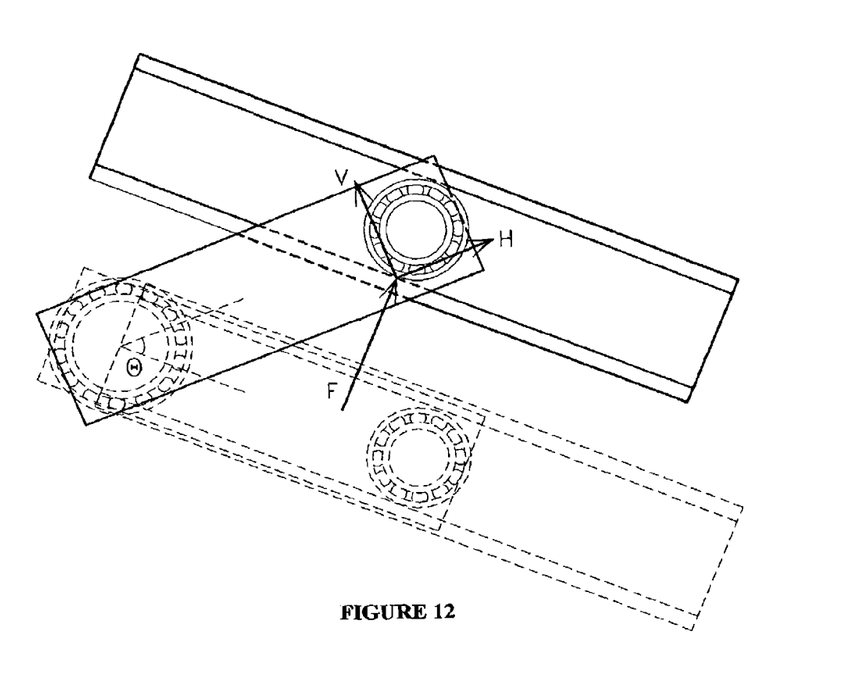
FIG. 12. One of the arms and its corresponding rail shown in undisplaced and displaced positions.

The rail system along with the arm ball bearings (4), forms the desired connection (roller hinge type connection) between the arm (2) ends and the bridge deck. With this type of a connection, each arm (2) will always be displaced laterally (relative to its corresponding rail) regardless of the movement direction of the bridge deck and the arm (2) does not need to follow the component of the deck displacement along the rail (10). This is true for all eight rails (10). As illustrated in FIG. 12, at the undeformed position, each arm (2) is parallel to its rail (10). As the displacement is imposed on the device, the arms (2) rotate and the angle, $\theta$, between the arm (2) and its rail (10) increases; Since the arm (2) has to twist the yielding core (1) as it rotates, a shear force (V) will be created in the arm (2), perpendicular to it (FIG. 12). This shear force must be balanced by the component of the force F normal to the arm (2) at the arm ball bearing-rail (arm end and rail) interface as shown in FIG. 12. This force, due to the presence of the arm ball bearing (4), is always perpendicular to the rail (10). However, its two components along and perpendicular to the arm (2) depend on the angle, $\theta$, between the arm (2) and its rail (10):

$$V = F \cdot \cos(\theta)$$

$$H = F \cdot \sin(\theta)$$

This means that for a shear force V (that is the force effective in creating a torsional moment in the core) to be created in the arm (2), the force, F, must be equal to:

$$F = V / \cos(\theta)$$

Figure 13:
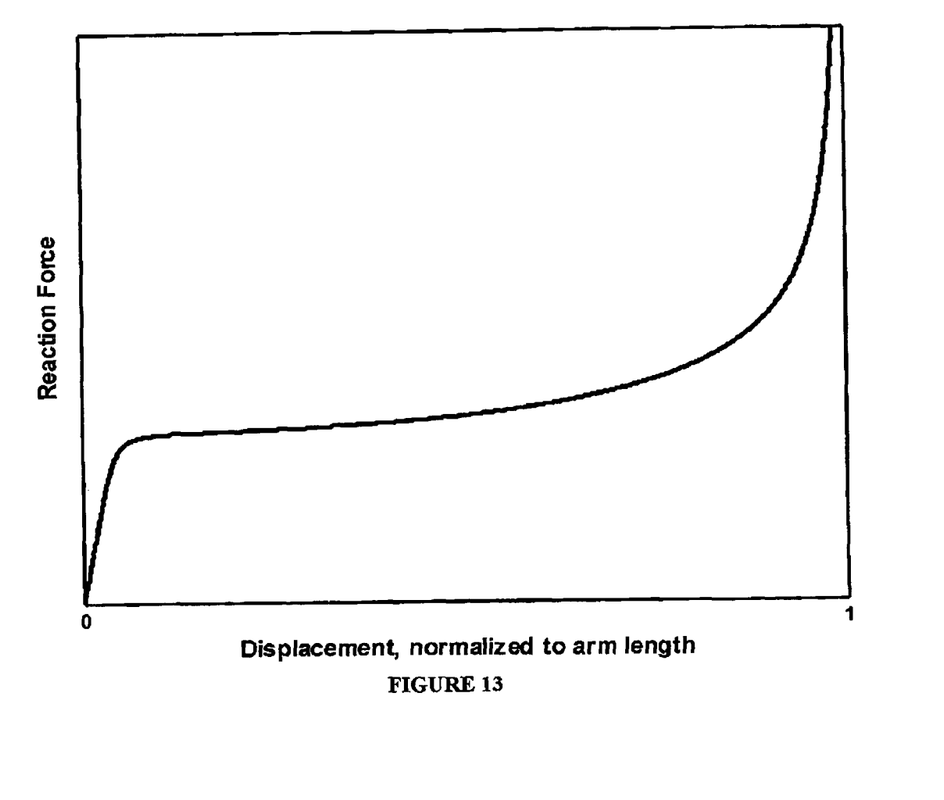
FIG. 13. Force-displacement diagram of the device when the displacement is imposed in the direction of one of the rails (any) and with the assumption of elasto-plastic behavior for the steel.

As the angle, $\theta$, increases, even if V remains constant (assuming an elasto-plastic behavior for steel), F will increase, giving the device its geometric hardening capability. It should be mentioned that the sum of the component of these forces (F) along the displacement direction, coming from all the eight rails (10) is equal to the reaction force of the hysteretic damper device. That is, the reaction force of the device is dependant on its displacement level even in plastic range and elasto-plastic material behavior. This hardening behavior is shown in FIG. 13. Also, this means that the displacement cannot exceed a certain limit. Theoretically, the limiting displacement is equal to the length of the arm (2). This displacement corresponds to $\theta=90°$. However, since at angles close to 90° the axial force generated in the arm (2) and the force, F, will be extremely large, the practical limit to this displacement can be set to, say, "arm length X sin(60)", corresponding to a maximum rotation of 60°. Considering some specific cases, if the anticipated displacement in the bridge deck should increase above this amount, a larger hysteretic device should be considered.

We claim:

1. A multi-directional torsional hysteretic damper serving as an anti-seismic device of hysteretic type with multi-directional action for protection of structures against earthquakes characterized in that, it is composed of;

at least eight identical yielding cores (1) each, in the shape of variable-diameter cylinder, which can yield, serving as energy dissipating elements by yielding due to large torsional shear stresses created via arms (2) welded to them, while the arms rotate back and forth and create torsion in the yielding cores (1), with each of the yielding cores (1) having one arm (2) welded to it at top and with each of the yielding cores being welded to a base plate (12) at its bottom and maintaining a torsional hinge connection with the plate diaphragm (6) through the use of core ball bearings (3) at the yielding cores to (1)—plate diaphragm (6) connection;

a supporting structure composed of supporting column (5) and the plate diaphragm (6), the function of which is to support the yielding cores (1) against bending by taking the major share of the bending moment and thus preventing excessive bending in the yielding cores (1) which are intended to yield in torsion while being twisted by the rotation of the arms (2);

a rail system comprising identical rails (10) in the shape of a channel section in the same number as the yielding cores (1) plus the top plate (11), with the rails (10) welded to the top plate (11) while being positioned parallel to the arms (2), the function of which are guiding the movement of the arms (2) at the arm's end points where arm ball bearings (4) are provided to create, in combination with the rails (10), a roller hinge type connection between the arm (2) ends and the bridge deck.

2. The multi-directional torsional hysteretic damper as claimed in claim 1 characterized in that, the arm ball bearings (4) are mounted on cylindrical mounting shafts (7) at the end points of arms (2) and are held in place by upper hollow cylindrical rings (8) and bottom hollow cylindrical rings (9) while the upper hollow cylindrical rings (8) are welded at the tops to the cylindrical mounting shafts (7).

3. The multi-directional torsional hysteretic damper as claimed in any of the preceding claims characterized in that, it is provided with a top plate (11) with slotted holes which provides the connection of the multi-directional torsional hysteretic damper to a bridge deck.

* * * * *